(12) United States Patent
Pomper et al.

(10) Patent No.: US 9,304,962 B2
(45) Date of Patent: *Apr. 5, 2016

(54) SYSTEM AND METHOD FOR DETERMINING ACCURACY OF AN INFRARED THERMOMETER MEASUREMENT

(71) Applicant: Fluke Corporation, Everett, WA (US)

(72) Inventors: Ken Pomper, Aptos, CA (US); Medwin Schreher, Santa Cruz, CA (US); Matt Rekow, Santa Cruz, CA (US)

(73) Assignee: Fluke Corporation, Everett, WA (US)

( * ) Notice: Subject to any disclaimer, the term of this patent is extended or adjusted under 35 U.S.C. 154(b) by 228 days.

This patent is subject to a terminal disclaimer.

(21) Appl. No.: 13/907,218

(22) Filed: May 31, 2013

(65) Prior Publication Data
US 2013/0289929 A1 Oct. 31, 2013

Related U.S. Application Data

(63) Continuation of application No. 12/749,373, filed on Mar. 29, 2010, now Pat. No. 8,457,922.

(60) Provisional application No. 61/164,045, filed on Mar. 27, 2009.

(51) Int. Cl.
*G06F 15/00* (2006.01)
*G01J 5/02* (2006.01)
*G01J 5/08* (2006.01)
*G01J 5/00* (2006.01)

(52) U.S. Cl.
CPC . *G06F 15/00* (2013.01); *G01J 5/00* (2013.01); *G01J 5/02* (2013.01); *G01J 5/025* (2013.01); *G01J 5/026* (2013.01); *G01J 5/0265* (2013.01); *G01J 5/08* (2013.01); *G01J 5/089* (2013.01)

(58) Field of Classification Search
CPC ........................................................ G01J 5/089
See application file for complete search history.

(56) References Cited

U.S. PATENT DOCUMENTS 6,709,154 B1 * 3/2004 Janotte ........................ 374/121
2002/0143257 A1 * 10/2002 Newman et al. ............. 600/474

* cited by examiner

*Primary Examiner* — Phuong Huynh
(74) *Attorney, Agent, or Firm* — Seed IP Law Group PLLC

(57) ABSTRACT

A system and method for determining whether a temperature measurement made with an infrared thermometer is accurate is disclosed. An infrared sensor array is used to detect infrared radiation from a target object. By analyzing the relative values of output signals from the individual sensor elements, a determination can be made whether radiation from the target object sufficiently fills the field of view of the detecting element of the instrument. A temperature measurement is considered accurate if this criteria is met.

20 Claims, 13 Drawing Sheets

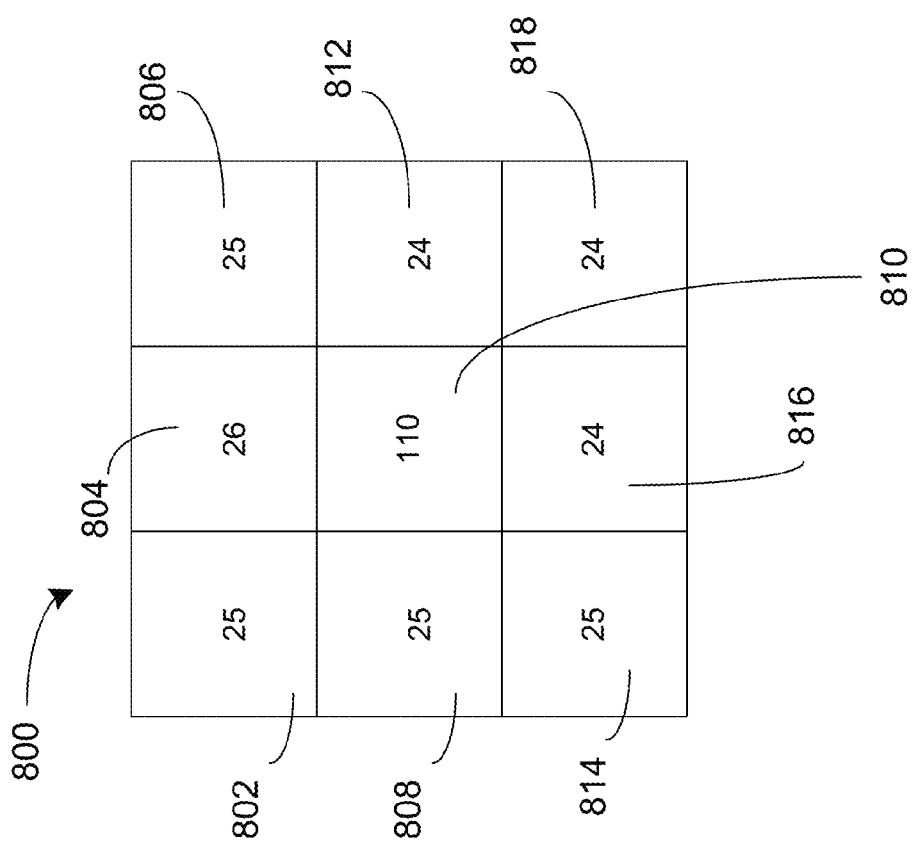
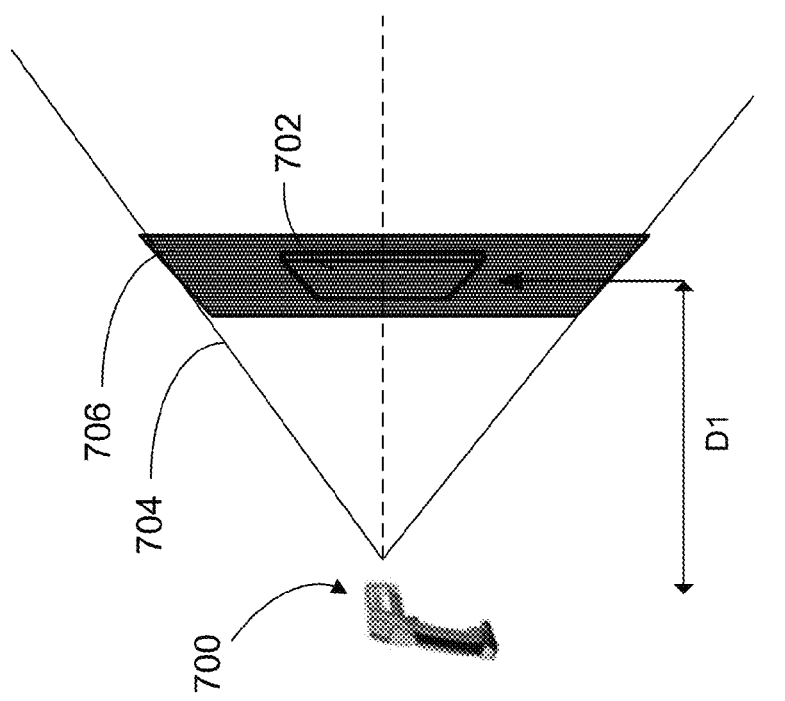

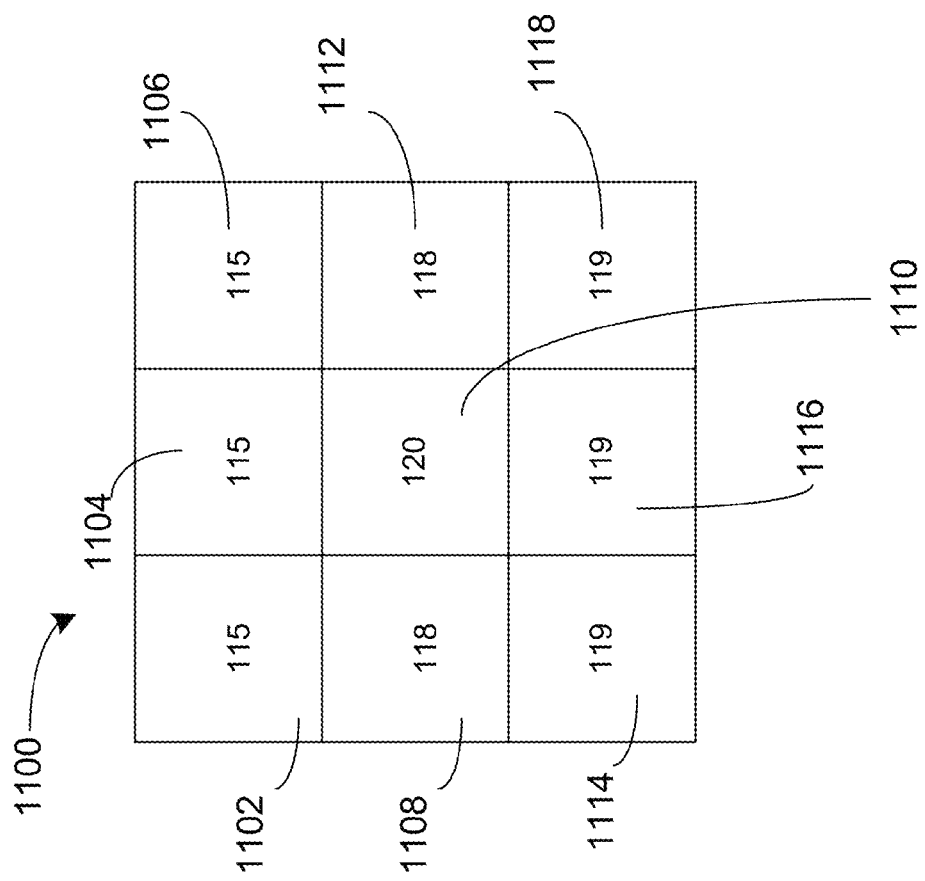
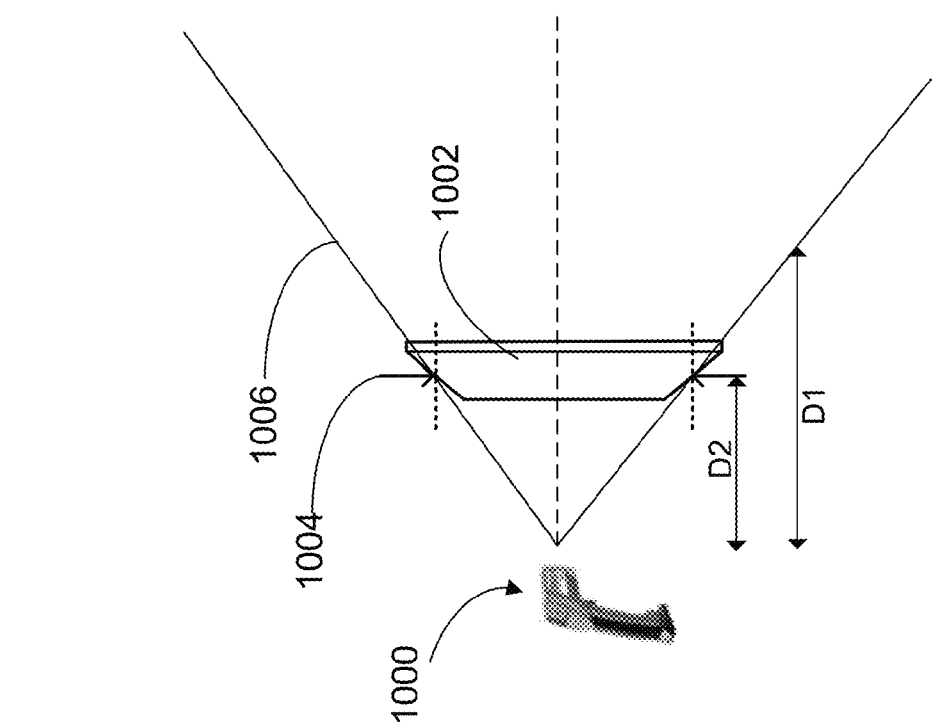
FIGURE 11
FIGURE 10

ERROR — 1310

SYSTEM AND METHOD FOR DETERMINING ACCURACY OF AN INFRARED THERMOMETER MEASUREMENT

CROSS REFERENCE TO RELATED APPLICATIONS

This application is a continuation of U.S. patent application Ser. No. 12/749,373, filed Mar. 29, 2010, entitled "System And Method For Determining Accuracy Of An Infrared Thermometer Measurement," which claims priority to U.S. Provisional Application No. 61/164,045, filed Mar. 27, 2009, entitled "System And Method For Determining Accuracy Of An Infrared Thermometer Measurement," both of which are hereby incorporated by reference in their entirety.

TECHNICAL FIELD

The following disclosure is related to infrared measurement systems and more particularly to systems and methods for determining whether a temperature measurement of a target using an infrared thermometer may be inaccurate.

BACKGROUND

Non-contact temperature measurement instruments allow a user to measure the temperature of a surface of an object or portion of an object without touching the object. One common type of non-contact temperature measurement device is an infrared thermometer. Infrared thermometers determine the temperature of an object by measuring the infrared radiation emitted by the object. The amount of infrared radiation that is emitted at particular wavelengths is correlated with the temperature of the object. If the amount of infrared energy emitted by the object and its emissivity are known, then the object's temperature can be determined without contacting the object. The optical system of an infrared thermometer collects the infrared energy from a measurement spot and focuses it upon a detector. The detector then converts the energy to an electrical signal that can be displayed in units of temperature. Many infrared thermometers allow a user to ascertain the temperature of a spot on an object by aiming the thermometer at the object.

As discussed above, many infrared thermometers work by using a known relationship between thermal radiation and emissivity. The emissivity of a material is the ratio of energy radiated by a particular material to energy radiated by a blackbody at the same temperature. Emissivity is a measure of a material's ability to radiate absorbed energy. A true blackbody has an emissivity of one, while all real objects have an emissivity that is less than one. The output signal of the detector of an infrared thermometer is related to the thermal radiation, j*, of the target object through the Stefan-Boltzmann law:

$$j^* = \epsilon \sigma T^4$$

The constant of proportionality, $\sigma$, is the Stefan-Boltzmann constant, and $\epsilon$ is the emissivity of the object. An infrared thermometer measures the thermal radiation j* of the object. Thus, if the emissivity of the target object is known, the Stefan-Boltzmann law can be used to calculate an approximate temperature, T, of a spot on the surface of the object.

BRIEF DESCRIPTION OF THE DRAWINGS

FIG. 7 illustrates a schematic view of an IR thermometer and an object within the IR sensor's field of view, according to an embodiment of the disclosure.

FIG. 8 illustrates example output signals of the sensor array for the IR thermometer of FIG. 7, according to an embodiment of the disclosure.

FIG. 10 illustrates a schematic view of the IR thermometer and an object that fills the sensor array's field of view, according to an embodiment of the disclosure.

FIG. 11 illustrates example output signals of the sensor array for the IR thermometer of FIG. 10, according to an embodiment of the disclosure.

FIG. 13 illustrates an example of a notification message displayed on a display screen of an IR thermometer, according to an embodiment of the disclosure.

FIG. 14 illustrates another example of a notification message displayed on the display screen of an IR thermometer, according to an embodiment of the disclosure.

FIG. 15 illustrates another example of a notification message displayed on the display screen of an IR thermometer, according to an embodiment of the disclosure.

FIG. 16 illustrates another example of a notification message displayed on the display screen of an IR thermometer, according to an embodiment of the disclosure.

DETAILED DESCRIPTION

A novel apparatus and technique are disclosed for determining whether a temperature measurement made with an infrared thermometer is accurate. Ideally, an object being measured should overfill the field of view of the IR detector (or sensor) used in an IR thermometer in order to provide an accurate measurement of the object's temperature. The infrared thermometer uses an infrared detector array where each detector element in the array is configured to provide a temperature measurement related to the thermal energy captured by the respective area of that detector, and each detector is independent of neighboring detectors.

When measuring an object of uniform temperature, if of all the measurements of the individual detectors surrounding a specific detector are consistent and fall within a predetermined range, then it can be concluded that the object fills the field of view of the specific detector, and the temperature reading provided by that detector is accurate. However, if the measurements of the individual detectors are inconsistent, this is an indication that the object being measured is either non-uniform in temperature or is under-filling the field of view of the detector. In the typical case where a target object has a uniform temperature within the particular area of interest, if the latter condition occurs then the user can be notified to either readjust (or re-aim) the direction that the thermometer is pointing in or to move closer to the object (to better fill the field of view of the particular detector) to take another measurement. Additionally, the disclosure relates to a method and apparatus in which the infrared thermometer is computer-controlled, such that an indication of a non-uniform temperature, mis-aiming or mis-positioning of the instrument, or an under-filling of the field of view is sent to a positioning controller system associated with the instrument to perform positioning correction or adjustment.

Figure 1:
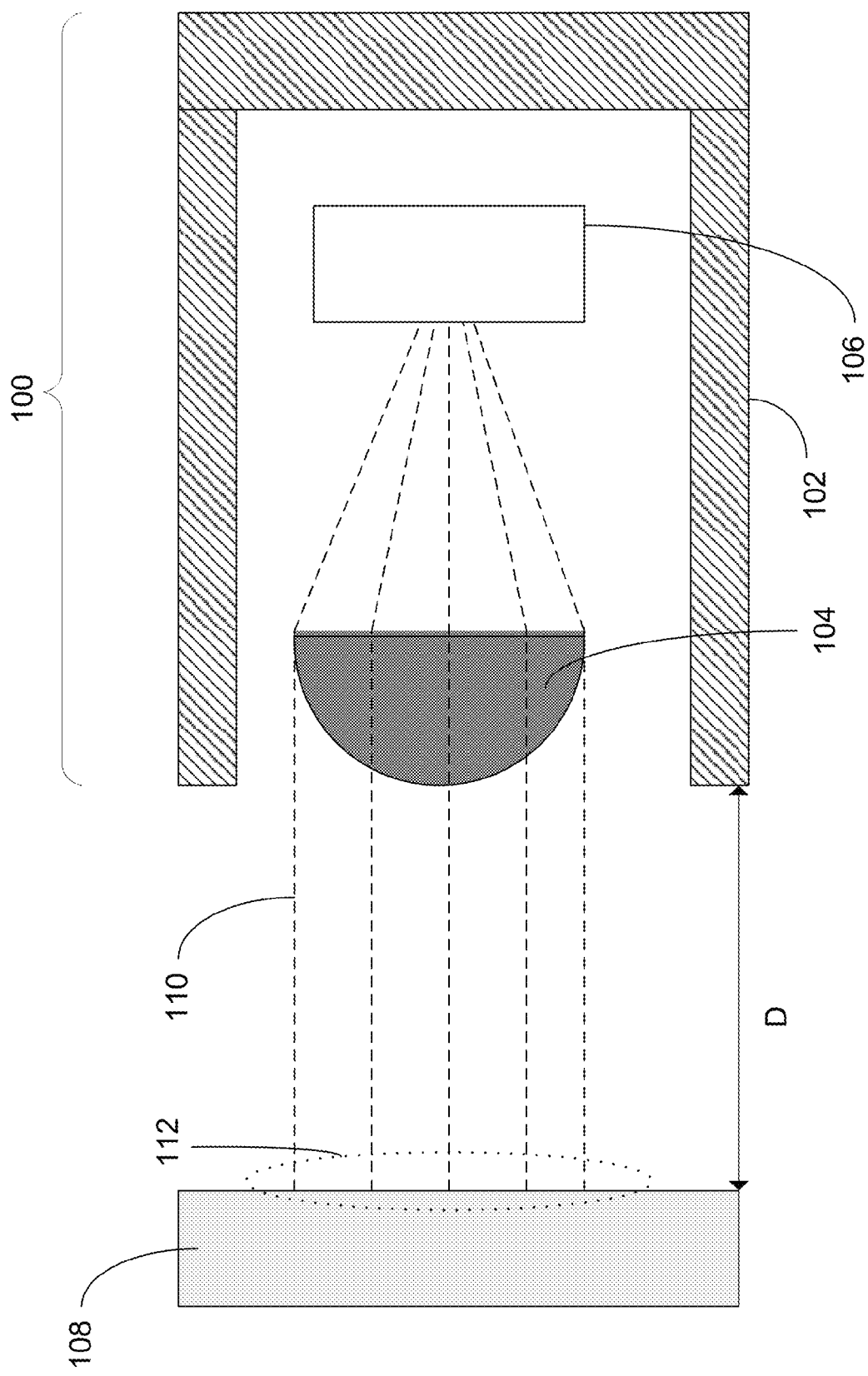
FIG. 1 is a schematic view of an example infrared (IR) thermometer.

FIG. 1 illustrates a system diagram of an infrared (IR) thermometer 100 placed in front of a target object 108 to be measured. The IR thermometer 100 includes a housing 102 having a cavity, and within the cavity are an optical system 104 and an IR detector 106. The IR thermometer 100 is located a distance D from the object 108. The object 108 emits infrared radiation that is related to the temperature of the object 108. A portion of the infrared radiation 110 emitted by the object 108 is captured by the optical system 104 and focused onto the detector 106, and an electrical signal is generated that corresponds to the temperature of the measured area 112 of the object 108. The temperature reading is then displayed to the user on a display screen (not shown) located on the IR thermometer 100.

Figure 2:
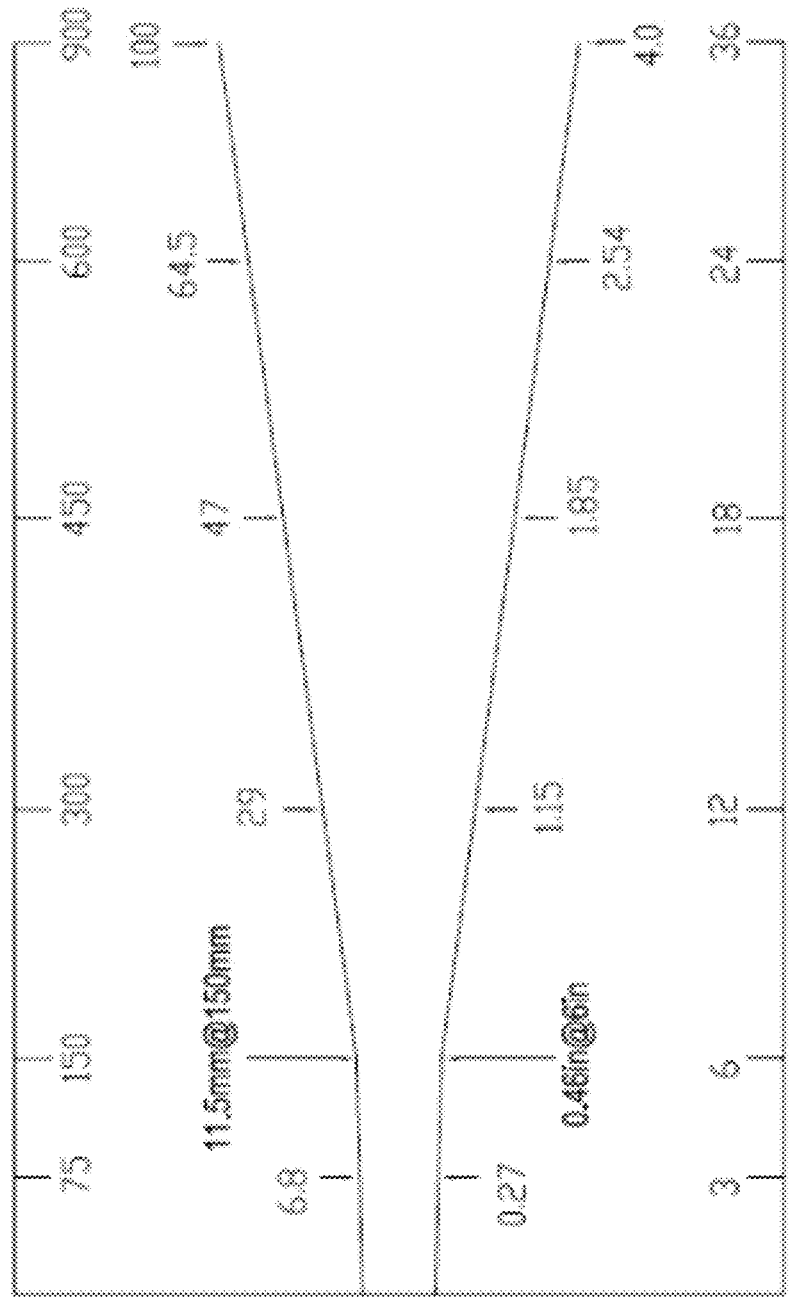
FIG. 2 illustrates the concept of distance-to-spot ratio for infrared thermometers.

When taking measurements with an IR thermometer, one should consider factors that affect the accuracy of the temperature measurement. A key factor is the optical resolution of an infrared thermometer which defines the minimum area that can be measured. The optical resolution as relates to a specific target object will depend on factors such as the distance of the object from the instrument, the focus distance of the instrument, and the minimum resolvable spot size at the focus point at the detector in the instrument. FIG. 2 shows an optical profile or field of view as it is seen from the side of an instrument. Notice that the ratio of the distance from the instrument to the spot size (D:S ratio) is typically not constant as the distance between the instrument and a target changes. For example, in FIG. 2, the D:S ratio at the focal point is 13.1, while the D:S ratio in the far field is 9.

Figure 3:
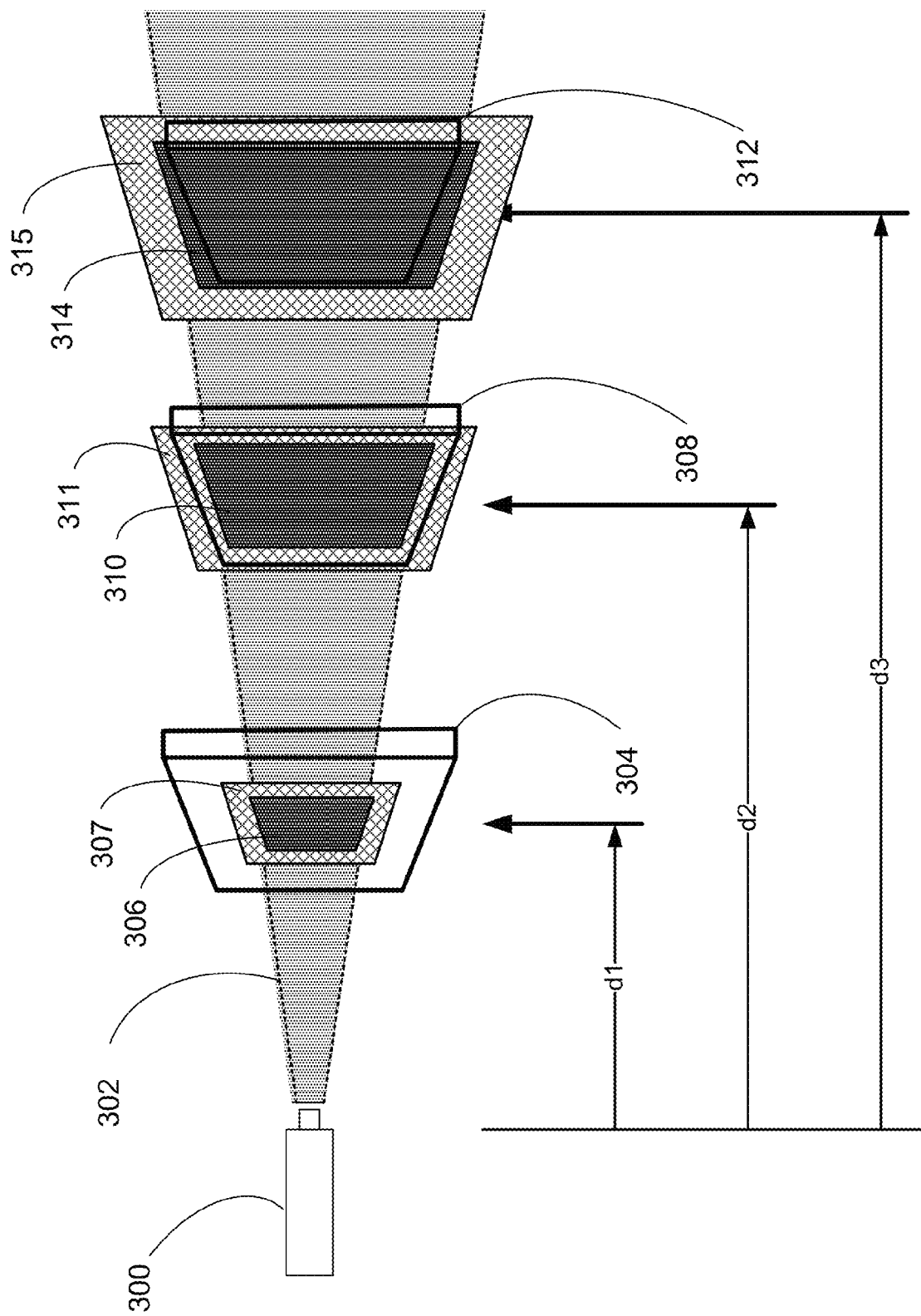
FIG. 3 illustrates the concept of field of view for infrared thermometers.

FIG. 3 shows an IR thermometer 300 whose detector has a field of view 302. The optical system of an infrared thermometer picks up the infrared energy emitted by a measurement spot and focuses it onto a detector. The area of the measurement spot over which the thermometer detects infrared energy increases with distance from the thermometer. The measurement spots correspond to the shape of the detector array in the IR thermometer 300 and are rectangular. Although for ease of depiction, the measurement spots 306, 310, 314 shown in FIG. 3 are sharp rectangles, typically, a measurement spot has fuzzy edges, rather than sharp edges. In fact, only approximately 90% of the energy detected by an IR thermometer typically comes from within what the manufacturers typically specify as the main measuring spot. The remaining 10% or so of the energy is collected from a larger spot that lies beyond the boundaries of the main measuring spot due to scattering and the nature of the collection optics in the IR thermometer. In FIG. 3, the main measuring spots 306, 310, 314 are depicted by dark shading, and each main measuring spot has a corresponding larger spot 307, 311, 315 depicted by cross-hatching to show that the detectors in the array of the IR thermometer 300 actually captures energy from the larger spot, beyond the main measuring spot.

If the target does not completely fill the larger spot, the IR thermometer will receive radiation from the background, resulting in an inaccurate temperature measurement if the background temperature differs from the target object. Because IR spot thermometers determine the average temperature of all surfaces within the field of view of the detector, if the temperature of the area around the object (e.g., the background) is different from the object or spot temperature, a measurement error can occur. FIG. 3 shows three different objects that intersect the field of view 302 at various distances from the IR thermometer 300. Object 304 is located closest to the IR thermometer 300 at a distance d1 from the thermometer 300 and is larger than the larger spot 307. Object 308 is located farther away from the IR thermometer 300 than object 304, at a distance d2 from the thermometer 300; it is approximately the same size as the main measurement spot 310. Object 312 is located farther away from the IR thermometer 300 (at a distance d3 from the thermometer) than both object 304 and object 308; it does not completely fill the main measurement spot 314 within the detector's field of view.

The IR thermometer 300 will be able to obtain the most accurate temperature measurement for the first and closest object 304. This is because object 304 completely fills the field of view 302 and the larger spot 307, thus the detector in the IR thermometer 300 will not "see" any infrared radiation contribution from anything except the first object 304, for example from an object not intended to be measured or from background radiation. For object 308, the IR thermometer 300 will likely obtain a fairly accurate measurement. However, the measurement may not be as accurate as the measurement for object 304 because although the measuring spot 310 senses only infrared radiation from the object 308, the detector also senses radiation emanating from the larger spot 311 Finally, the IR thermometer 300 will likely experience errors in attempts to measure the temperature of the third object 312 because the detector in the IR thermometer 300 will sense temperatures from objects or areas beyond the edges of the third object 312 as depicted by measuring spot 314. Thus, for example, a user using a handheld device that is standing too far from the spot or object to be measured or is pointing the device slightly askew will obtain an inaccurate measurement.

Figure 4A:
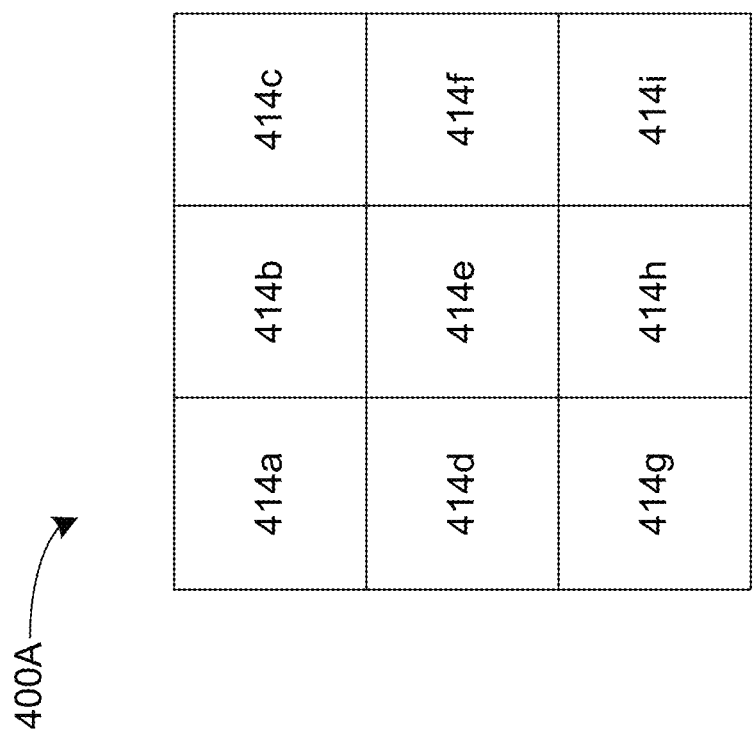
FIG. 4A shows an example sensor array, according to an embodiment of the disclosure.

In one embodiment, the detector 106 in FIG. 1 can be a sensor array. One example of a sensor array 400A is shown in FIG. 4A. Sensor array 400A is depicted as a 3×3 array of nine sensor elements, or pixels, 414a-i. Each sensor element 414a-i measures the infrared radiation impinging upon the active area of that particular sensor element and is independent of all the other sensor elements 414a-i. Further, each sensor element 414a-i produces an output electrical signal that corresponds to the temperature of the portion of the object being measured by that particular sensor element.

Figure 4B:
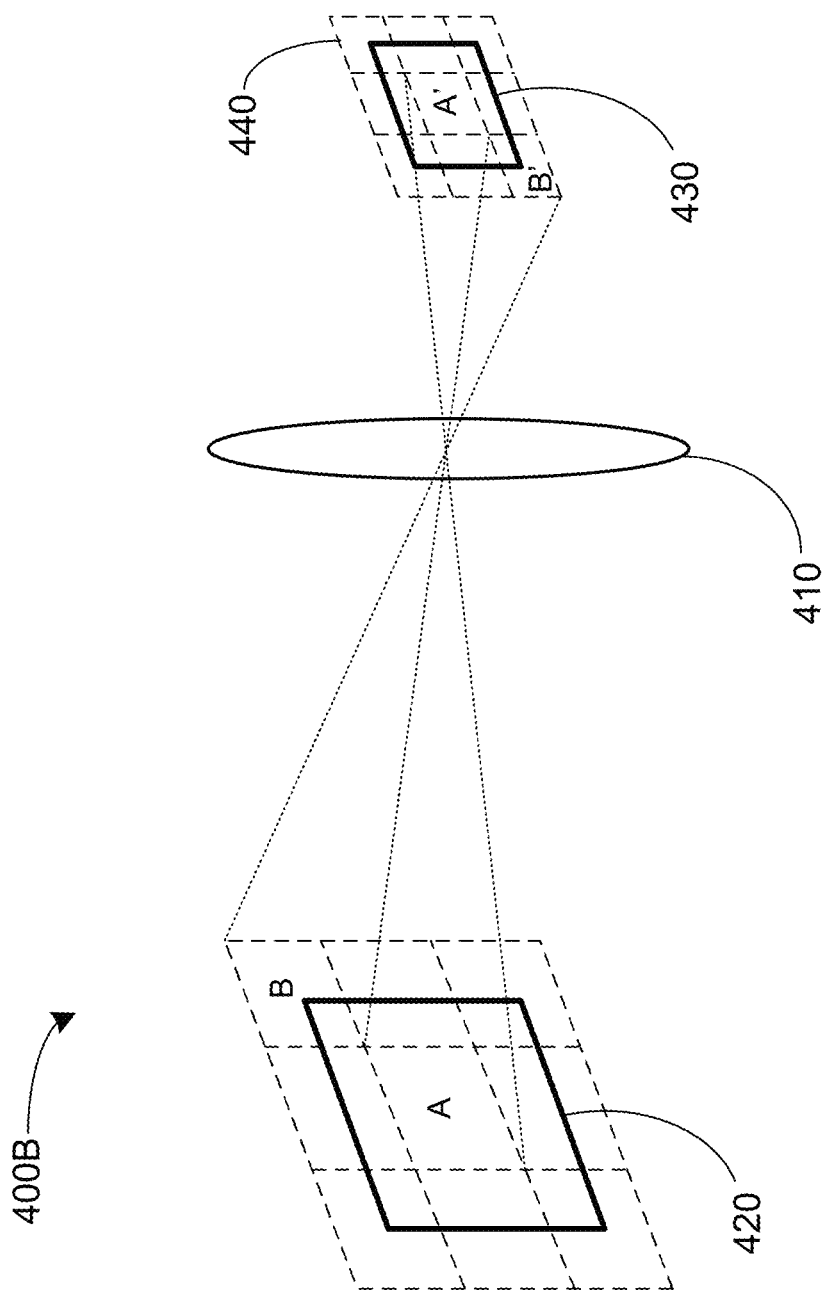
FIG. 4B shows an example of how infrared radiation emitted by a target object is imaged onto a sensor array, according to an embodiment of the disclosure.

FIG. 4B shows an example 400B of how a portion of the infrared radiation from a target object to be measured is imaged onto the infrared sensor array 440 by optical system 410. The optical system 410 has a field of view 420 at the object. The radiation from object seen by the field of view 420 is imaged as radiation 430 onto the sensor array 440, and the sensor array 440 includes 9 sensor elements. Center element A' in the sensor array 440 receives the radiation from the target object that is within the area A of the field of view 420. Corner element B' in the sensor array 440 receives the radiation from the target object that is within the area B of the field of view 420. For clarity, the other seven elements of the sensor array 440 are not labeled, but they each receive radiation from the target object within a corresponding area in the field of view 420.

The sensor array can have any number of elements arranged in any shape. For example, the sensor array can have 16 elements arranged in a 4×4 square, or 12 elements arranged in a 3×4 rectangle. However, the shape of the sensor array will correspond to the shape of the target infrared radiation focused by the optical system of the temperature measurement system onto the sensor array. In one embodiment, the sensor array is square, and the temperature measured by the center element of the array is the desired temperature measurement if the radiation from the target object or portion of the target object sufficiently fills the field of view of the center element of the sensor array.

Figure 5B:
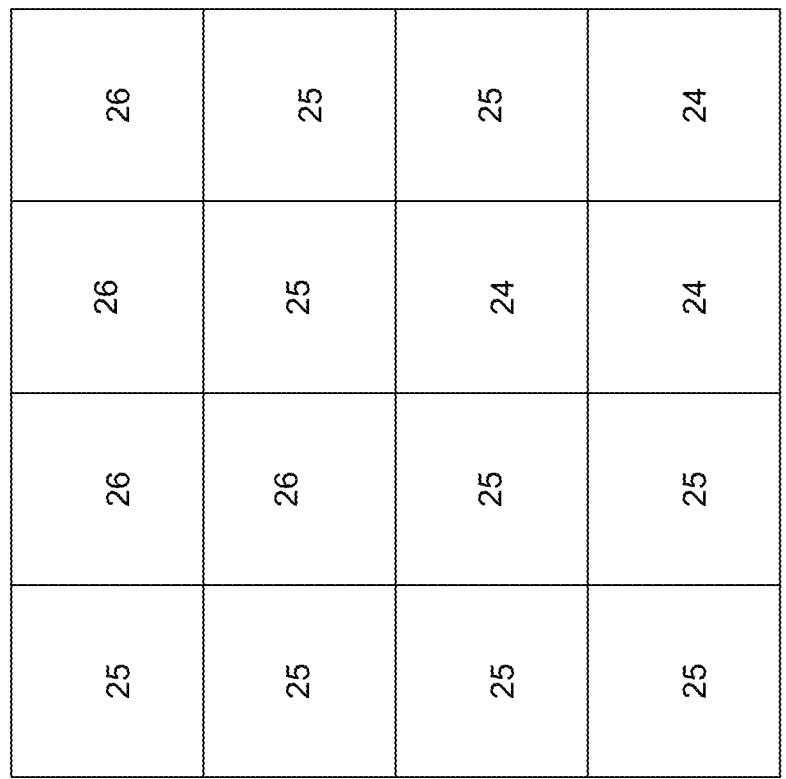
FIGS. 5A and 5B show schematic views of example output signals of sensor arrays, according to an embodiment of the disclosure.
Figure 5A:
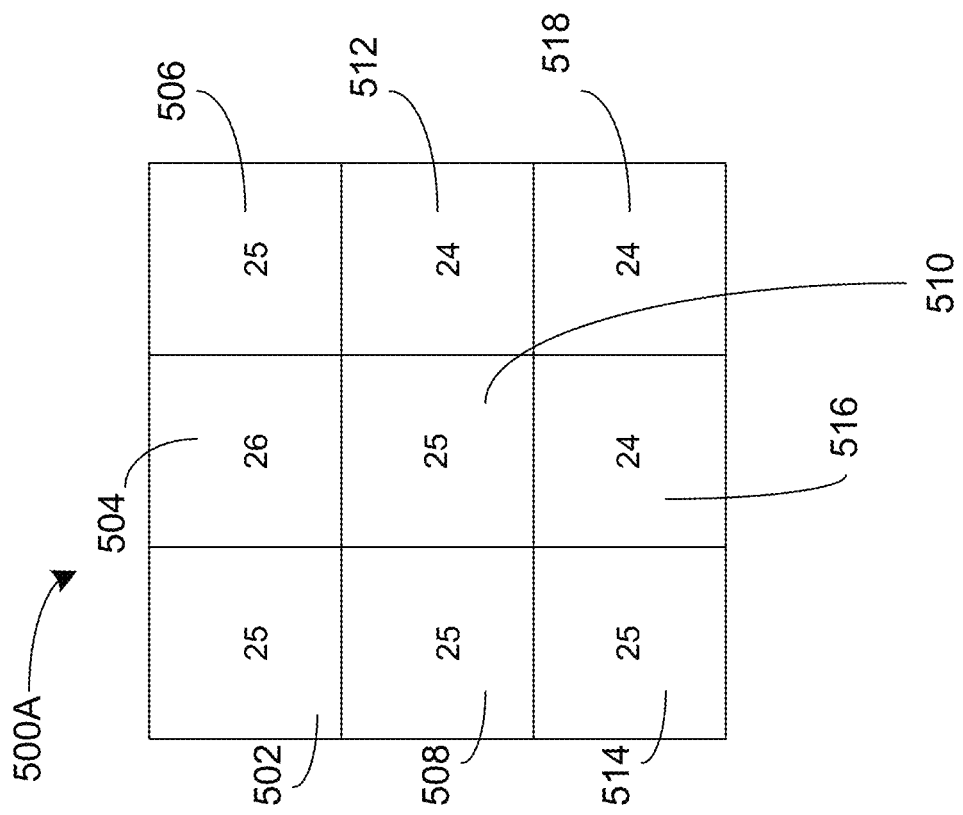

FIG. 5A shows example output signals 500A corresponding to a 3×3 sensor array such as the sensor array 400A shown in FIG. 4A. The output signal 500A is made up of the individual output signals from the 3×3 sensor array. The number in each pixel in FIG. 5A represents the output signal of a sensor element which corresponds to the thermal radiation captured by its measurement area. For example, pixel 502 corresponds to the sensor element 414a and shows an output signal of 25 degrees. Pixel 504 corresponds to the sensor element 414b and shows an output signal of 26 degrees. Likewise, pixels 506, 508, 510, 512, 514, 516, and 518 correspond to the other sensor elements (414c, 414d, 414e, 414f, 414g, 414h, and 414i). FIG. 5B shows example output signals 500B for a 4×4 sensor array. In other embodiments, the number of elements in the sensor array can vary according to the application and level of accuracy needed for the measurement.

Figure 6:
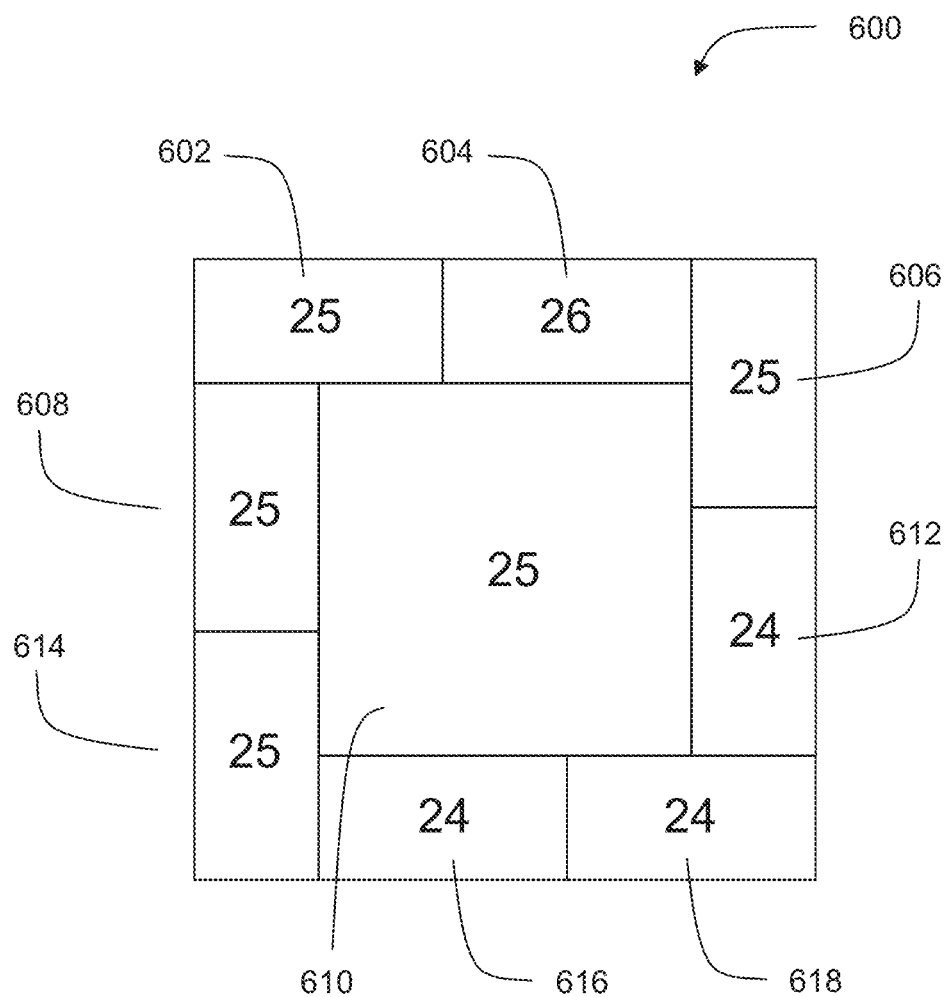
FIG. 6 is a schematic view of example output signals of a 3×3 sensor array having a larger center pixel area, according to an embodiment of the disclosure.

In some embodiments, the individual elements in the sensor array 400A have different areas, thus each sensor element can have different optical resolutions. For example, the sensor element corresponding to the center pixel 610 of FIG. 6 can have an area of approximately 4.5 times each of its neighboring sensor elements corresponding to the pixels 602, 604, 606, 608, 612, 614, 616, and 618.

In one embodiment, the IR thermometer calculates the temperature of a spot or object being measured based upon the information from one, some, or all of the output signals from the individual sensor elements within the sensor array. For this reason the user of an IR thermometer should aim to fill the field of view of at least a center detector element with the spot or object the user wishes to measure, and a center detector element is one that has at least one neighboring element on each side.

In FIG. 7, an IR thermometer 700 is located a distance D1 away from a target 702. The detector of the IR thermometer 700 has a field of view 704, and a main measurement spot 706 at distance D1. The IR thermometer 700 has a 3×3 sensor array. The individual sensor elements of the sensor array in the IR thermometer 700 measure the temperature for the corresponding portion of the measurement area 706.

FIG. 8 shows example output signals 800 from the sensor array for the IR thermometer 700 of FIG. 7. Because the target 702 does not completely fill the main measurement spot 706 of the detector, the output signals from the individual sensor elements vary greatly. In the example shown, the actual target 702 has a temperature of approximately 120 degrees; however, the target 702 may be surrounded by other non-target objects or empty space having different temperatures. The center pixel 810 shows an output signal of 110 degrees, whereas the other pixels 802, 804, 806, 808, 812, 814, 816, and 818 show output signals ranging from 24 to 25 degrees. In this situation, a typical IR thermometer could average the output signals from all the pixels 802, 804, 806, 808, 810, 812, 814, 816, and 818 and display a temperature reading based on the average of all the output signals or display the output signal for the center pixel 810. In either situation, the temperature reading displayed to the user does not accurately reflect the true temperature of the target 702 because the target 702 does not completely fill the field of view of the detector. The user operating the IR thermometer 702 can move closer to the target 702 to obtain a more accurate reading.

In some embodiments of the disclosure, the IR thermometer 700 includes a quality control means that analyzes the output signals from the individual elements in the sensor array to determine whether the sensor array measurement is accurate. The quality control means can be a processor or other device capable of carrying out the method shown in FIG. 9.

At block 910, infrared radiation in the field of view of the IR thermometer's detector is received through the thermometer's optics and focused on an infrared sensor array. Then (or simultaneously, as this is occurring) at block 920, output signals are generated by the individual sensor elements of the sensor array.

At decision block 930, the instrument decides if the output signal measurements are acceptable. In one embodiment, the output signal of a detector element at or near the center of a portion of a sensor array can be compared to the surrounding sensor elements. The standard deviation of all the sensor elements with respect to the center detector element is calculated. If the standard deviation between the surrounding elements and the central element is less than a preselected value, then the infrared radiation from the target is considered to sufficiently fill the field of view of the detector array and/or there is a sufficient uniform field.

Many other ways can be used to determine whether the output signal measurements from the detector array are acceptable. For example, the output signals are acceptable if the difference between the highest and lowest output signals is less than a predetermined percentage, for example 10%, of the average of the output signals of the sensor array elements. The predetermined percentage can be dependent, for example, upon the amount of noise in the environment or the desired accuracy of the temperature measurement.

In some embodiments, an output signal from a sensor element is deemed to be unacceptable if it differs from the average of all the output signals by more than approximately 50%. In some embodiments, an output signal is deemed to be unacceptable if it differs from the average of the all the output signals by more than approximately 20%. The threshold percentage can be set depending upon noise in the operating environment and/or desired temperature accuracy.

If the measurements are acceptable (block 930—Yes), at block 940 the temperature is calculated. The temperature can be calculated many ways including, but not limited to, a simple average of all of the output signals from the sensor array elements, a weighted average of the output signals from the sensor elements, or taking the value of one of the center pixels. Other methods can also be used for calculating the temperature from the individual sensor element measurements.

Then at block 950, the calculated temperature is displayed on the instrument's screen, and the user is optionally notified that the output signals from the individual sensor elements were acceptable such that the field of view has been sufficiently filled with the target object.

If the output signal measurements are not acceptable (block 930—No), at block 960 the user is notified accordingly. The notification can include instructions for the user to check whether the instrument is being aimed directly at the target object. Additionally or alternatively, the notification can instruct the user to move closer to the target object because the target is not sufficiently filling the field of view of the instrument's detector. The notification may or may not include a temperature measurement.

FIGS. 10 and 11 show how the quality control means can improve the temperature reading from the IR thermometer 1000. For the scenario depicted in FIG. 10, the thermometer has been moved closer to the target 1002 compared to the scenario depicted in FIG. 7. In FIG. 10, the target 1002 completely fills the IR thermometer's 1000 field of view 1004. An example of corresponding output signals 1100 for each of the sensor elements are shown in FIG. 11. The range of measurements for the sensor elements falls between a much narrower range, from 115 to 120, than the measurements shown in FIG. 8. Thus, a more accurate reading of the temperature of the target 1002 is obtained.

Figure 12:
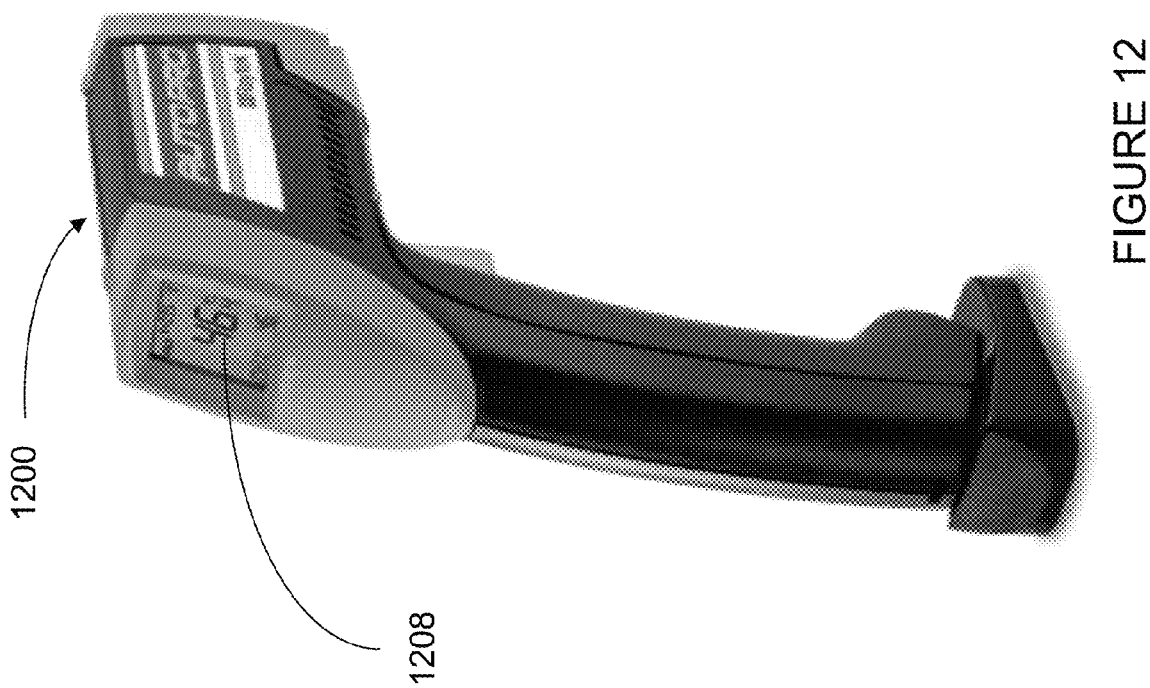
FIG. 12 is a perspective view of an example IR thermometer having a display screen, according to an embodiment of the disclosure.

The user can be notified that the target does not sufficiently fill the field of view of the detector in several different ways. FIG. 12 shows a perspective view of the IR thermometer 1200 having a display screen 1208. Display screens are known in the art and are typically configured to display the temperature reading and other information. The display screen 1208 in FIG. 12 shows a temperature reading of 46 degrees along with other measurement information. In some embodiments, the display screen 1208 will not display the temperature reading if the quality control means determines that the target does not adequately fill the field of view of the instrument. In other embodiments, different forms of notification can be used.

Figure 9:
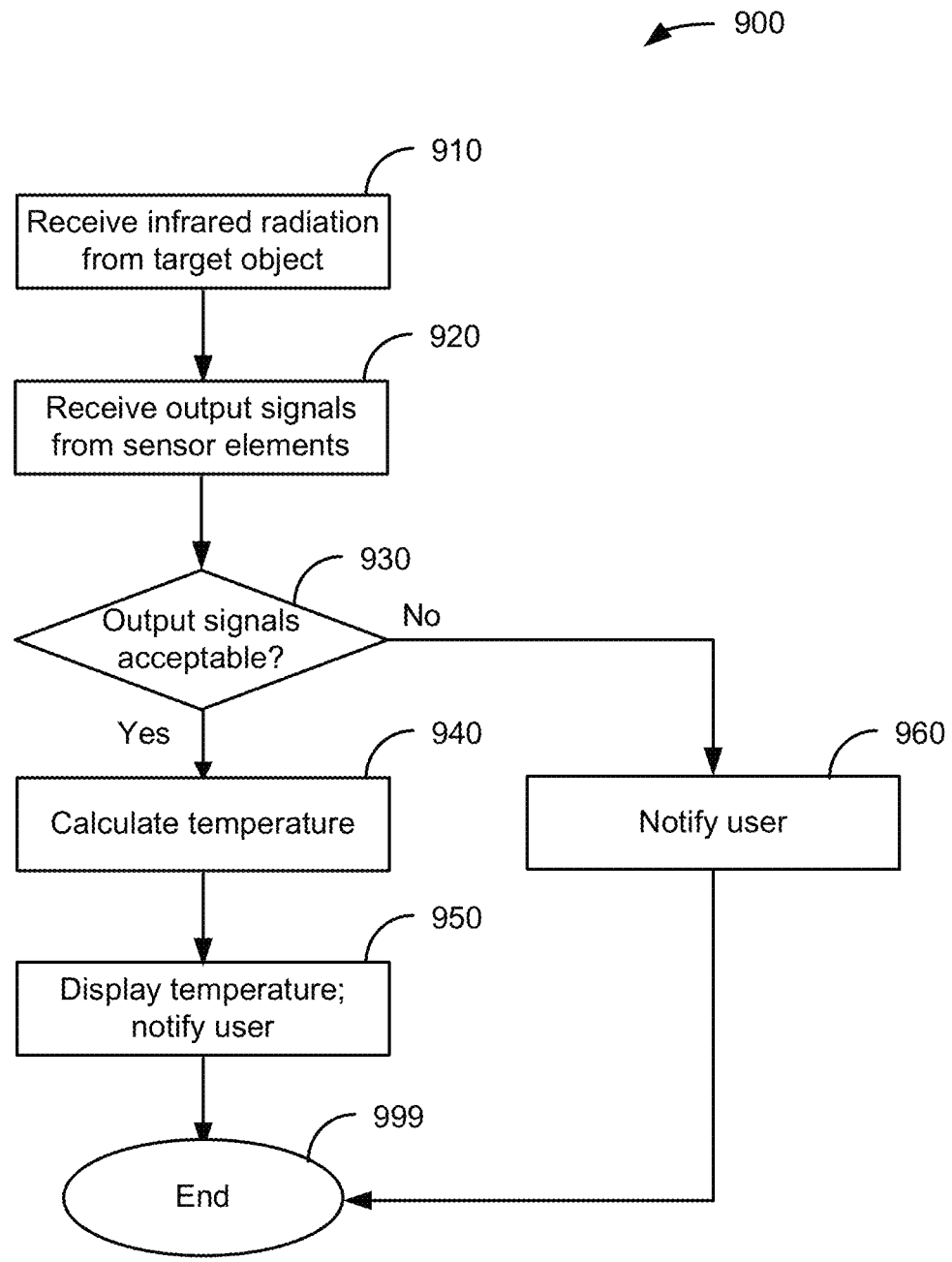
FIG. 9 is a block diagram showing a method of measuring the temperature of a target spot using an infrared thermometer, according to an embodiment of the disclosure.

FIGS. 13-16 show examples of different types of notification messages that can be displayed to the user at block 960 in FIG. 9. In FIG. 13, the display screen 1300 shows an error message 1310, "ERROR", indicating that there is an error in the measurement. In FIG. 14, the display screen shows an element, e.g., a representation of a man walking, directing the user to move closer to the target. In FIG. 15, the display screen shows an element 1514, e.g., an arrow, indicating to the user a direction for steering or aiming the IR thermometer so as to sufficiently fill the field of view of the detector array and/or capture a sufficiently uniform field. Other elements can also be used in other embodiments.

FIG. 16 shows the display screen 1600 displaying signal bars 1616 which are indicative of a signal quality of the IR thermometer measurement based on the relative values of the output signals of the sensor array elements. In some embodiments, the quality control means can also calculate this signal accuracy by analyzing the output signals. If the output signals are all consistent, for example varying by less than a given percentage such as 10%, the signal quality is considered high. The greater the variation of the sensor array elements, the lower the signal quality. Different cutoffs for variations in the output signals can be used for each signal quality bar displayed. Other graphical display elements besides signal bars can also be used to indicate the signal quality of the measurement. Additionally or alternatively, an indication of the signal quality of the measurement, an error message, directions to move the IR thermometer closer to the target or re-aim or otherwise tilt the instruments with respect to the target, and other messages can be provided to the user or positioning controller system through other means, such as verbally through speakers.

In one embodiment, no temperature is displayed on the screen if the signal quality is below a certain predetermined quality level. In one embodiment, the calculated temperature is displayed on the screen along with the signal quality.

Figure 17:
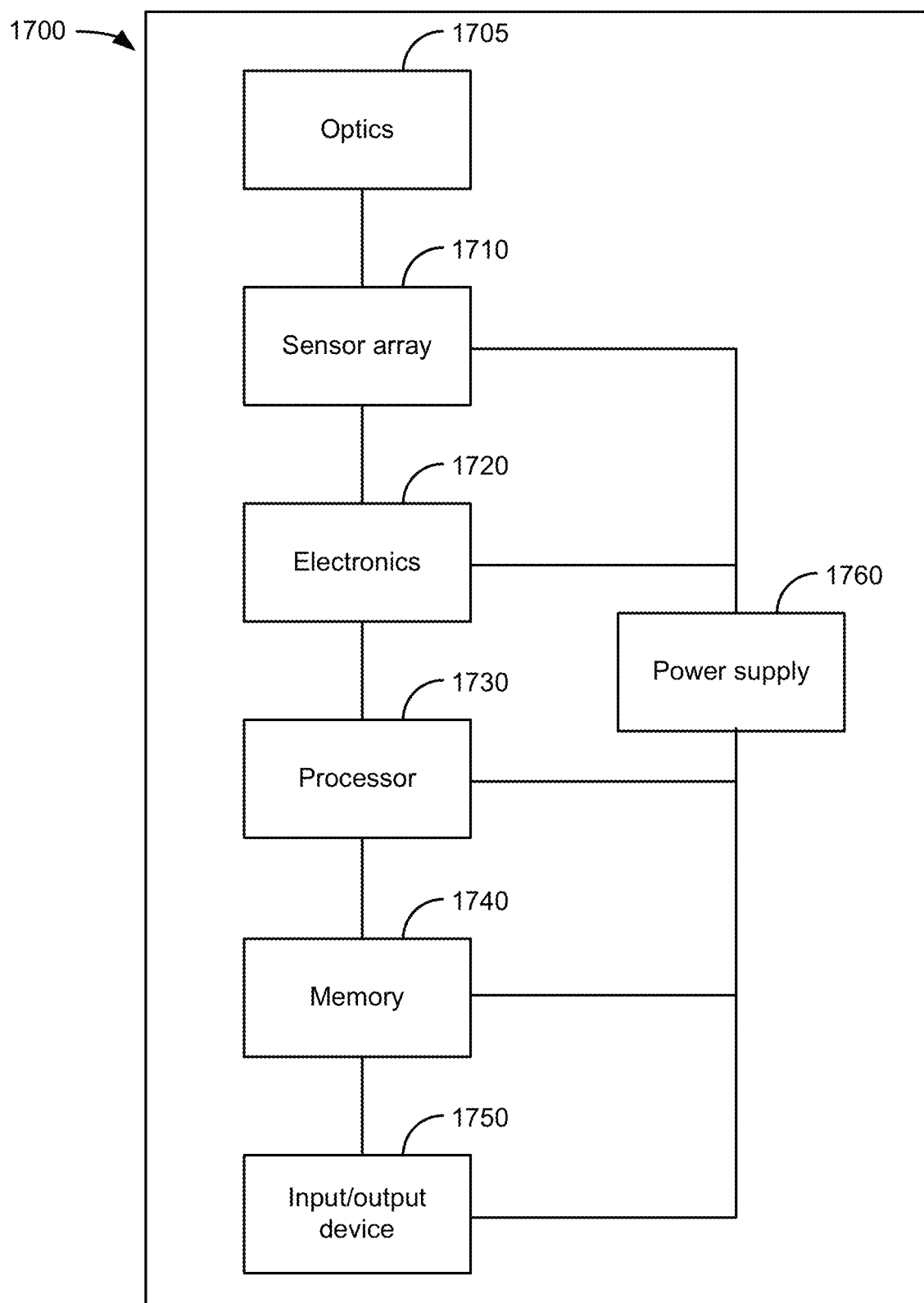
FIG. 17 shows an example block diagram of an IR thermometer, according to an embodiment of the disclosure.

FIG. 17 shows an example block diagram of an infrared thermometer 1700 used to make non-contact temperature measurements. The thermometer can include optics 1705, an infrared sensor array 1710, electronics 1720, one or more processors 1730, memory units 1740, input/output devices 1750, and a power supply 1760.

The optics 1705 can include optics for focusing, deflecting, and/or reflecting infrared radiation from a target object onto the sensor array 1710. The infrared sensor array 1710 can be composed of thermal detectors such as microbolometers or thermopiles, or could be composed of photon detectors such as photodiodes or phototransistors, or other thermal or photon detection device. A person of skill in the art will recognize that many materials and materials technologies may be suitable for use in the infrared sensor array. The sensor array 1710 responds to infrared radiation ranging from approximately 0.7 microns to approximately 20 microns and can have a peak sensitivity within this range. The electronics 1720 receive the output signals from the sensor array 1710 and pass them to the processor 1730 for analysis.

The processor 1730 can be used to run infrared thermometer applications including, but not limited to, deciding if the target object sufficiently fills the field of view, and averaging output signals for a period of time to reduce the impact of noisy measurements on the accuracy of the measured temperature. Memory 1740 can include but is not limited to, RAM, ROM, and any combination of volatile and non-volatile memory. A power supply 1760 can include, but is not limited to, a battery. The power supply 1750 can provide power to the sensor array 1710, electronics 1720, processor 1730, memory 1740, and/or input/output devices 1750. An input/output device 1750 can include, but is not limited to, triggers to start and stop the thermometer, visual displays, speakers, and communication devices that operate through wired or wireless communications. For example, a non-portable product may not include a display. Accordingly, an analysis to indicate reading quality and report deficiencies may be used to, for example, direct moving the sensor closer, aim the sensor more accurately, or just raise the alert that the target has non-uniform properties.

Many specific details of certain embodiments of the disclosure are set forth in the description and in the figures to provide a thorough understanding of these embodiments. A person skilled in the art, however, will understand that the disclosure may be practiced without several of these details or additional details can be added to the disclosure. Well-known structures and functions have not been shown or described in detail to avoid unnecessarily obscuring the description of the embodiments of the disclosure.

From the foregoing, it will be appreciated that specific embodiments of the disclosure have been described herein for purposes of illustration, but that various modifications may be made without deviating from the disclosure. Aspects of the disclosure described in the context of particular embodiments may be combined or eliminated in other embodiments. Further, while advantages associated with certain embodiments of the disclosure have been described in the context of those embodiments, other embodiments may also exhibit such advantages, and not all embodiments need necessarily exhibit such advantages to fall within the scope of the disclosure.

We claim:
1. A non-contact infrared measurement system, comprising:
an infrared sensor array having a plurality of sensor elements that generate output signals related to infrared energy detected by the sensor elements;

a processor communicatively coupled to the infrared sensor array, wherein the processor compares the output signals and, based on the comparison, determines whether the detected infrared energy sufficiently fills a field of view of at least a portion of infrared sensor array or is sufficiently uniform over at least a portion of the infrared sensor array; and an output device that provides notification of the determination.

2. The non-contact infrared measurement system of claim 1, wherein the processor determines whether the detected infrared energy sufficiently fills a field of view of at least a portion of the infrared sensor array or is sufficiently uniform over at least a portion of the infrared sensor array by:

selecting an output signal from a first sensor element in the sensor array;

comparing the output signal from the first sensor element to the output signals from neighboring sensor elements adjacent to the first sensor element; and determining that the infrared energy sufficiently fills the field of view or is sufficiently uniform over the portion of the sensor array if differences between the output signal from the first sensor element and the output signals from the neighboring sensor elements are within a predetermined value.

3. The non-contact infrared measurement system of claim 1, wherein if the processor determines that the detected infrared energy does not sufficiently fill the field of view or is not sufficiently uniform over the portion of the infrared sensor array, the output device provides a further notification indicating that the infrared measurement system should be repositioned and infrared energy redetected by the sensor array.

4. The non-contact infrared measurement system of claim 1, further comprising a position controller that performs position correction or adjustment of a position of the infrared measurement system, wherein in response to determining that the detected infrared energy does not sufficiently fill the field of view or is not sufficiently uniform over the portion of the infrared sensor array, the processor causes the position controller to reposition the infrared measurement system.

5. The non-contact infrared measurement system of claim 1, wherein providing notification of the determination further comprises providing a temperature derived from the output signals.

6. The non-contact infrared measurement system of claim 1, wherein the infrared sensor array is a square-shaped array or a rectangular-shaped array that includes at least three sensor elements on each side of the array.

7. The non-contact infrared measurement system of claim 1, wherein at least one of the sensor elements has a different size area for detecting infrared energy as compared to other sensor elements in the infrared sensor array.

8. The non-contact infrared measurement system of claim 1, wherein the plurality of sensor elements includes one or more photon detectors or thermal detectors.

9. A non-contact infrared measurement system, comprising:

a plurality of sensor elements that generate output signals related to infrared energy detected from a target, wherein the sensor elements are arranged in an array that detects infrared energy within a measurement spot;

a processor that evaluates information obtained from the output signals to determine whether the detected infrared energy sufficiently fills the measurement spot or is sufficiently uniform over the measurement spot; and an output interface that provides notification of the determination.

10. The non-contact infrared measurement system of claim 9, wherein the processor determines whether the detected infrared energy sufficiently fills the measurement spot or is sufficiently uniform over the measurement spot by:

selecting a first output signal corresponding to a sensor element within the array;

comparing information obtained from the first output signal to information obtained from the output signals of neighboring sensor elements in the array; and determining that the detected infrared energy sufficiently fills the measurement spot or is sufficiently uniform over the measurement spot if differences in the compared information are within a predetermined value.

11. The non-contact infrared measurement system of claim 10, wherein comparing information obtained from the first output signal to information obtained from the output signals of the neighboring sensor elements includes calculating a standard deviation of the output signals of the neighboring sensor elements with respect to the first output signal, and wherein determining that the detected infrared energy sufficiently fills the measurement spot or is sufficiently uniform over the measurement spot includes determining whether the standard deviation is within the predetermined value.

12. The non-contact infrared measurement system of claim 9, wherein the processor determines that the detected infrared energy does not sufficiently fill the measurement spot or is not sufficiently uniform over the measurement spot if the information obtained from the output signals indicates that infrared energy detected within the measurement spot is received from infrared radiation outside a desired measurement area of the target.

13. The non-contact infrared measurement system of claim 12, wherein the information obtained from the output signals indicates that infrared energy is received from infrared radiation outside the desired measurement area of the target if a difference between the output signals exceeds a predetermined threshold.

14. The non-contact infrared measurement system of claim 9, wherein if the processor determines that the detected infrared energy does not sufficiently fill the measurement spot or is not sufficiently uniform over the measurement spot, the output interface provides a further notification indicating that the infrared measurement system should be repositioned and infrared energy redetected by the plurality of sensor elements.

15. A method of evaluating a measurement taken with a non-contact infrared thermometer, comprising:

receiving, by a non-contact infrared thermometer, infrared radiation from a target, wherein the infrared radiation is received by an infrared sensor array of the thermometer, and wherein the infrared sensor array includes a plurality of sensor elements that each have an area;

generating an output signal for each of the sensor elements, wherein each output signal relates to an amount of infrared energy received within the area of the sensor element;

determining from the output signals whether the infrared radiation from the target sufficiently fills a field of view of at least one non-edge element of the sensor array or is sufficiently uniform over the infrared sensor array, wherein each non-edge element has at least one neighboring sensor element on each side; and generating a signal indicative of the determination.

16. The method of claim 15, wherein determining from the output signals whether the infrared radiation from the target sufficiently fills the field of view of at least one non-edge element or is sufficiently uniform over the sensor array comprises:
- selecting a first output signal corresponding to the at least one non-edge element of the sensor array;
- determining a standard deviation of the output signals with respect to the first output signal;
- determining that the infrared radiation from the target sufficiently fills the field of view of the at least one non-edge element or is sufficiently uniform over the sensor array if the standard deviation is less than a preselected value.

17. The method of claim 15, further comprising:
calculating a temperature of the target based upon the output signals; and
providing an indication of the temperature.

18. The method of claim 15, further comprising:
determining a signal quality based on the output signals; and
providing the signal quality using graphical or numerical display.

19. The method of claim 15, further comprising displaying an indication to re-position the infrared measurement system, if the infrared radiation from the target does not sufficiently fill the field of view of the at least one non-edge element of the sensor array or is not sufficiently uniform over the sensor array.

20. The method of claim 15, further comprising:
displaying a notification message on a display of the infrared measurement system, wherein the notification message is representative of the generated signal that is indicative of the determination; and
displaying a temperature on the display.

* * * * *